US011537958B2

(12) United States Patent
Davis et al.

(10) Patent No.: US 11,537,958 B2
(45) Date of Patent: Dec. 27, 2022

(54) AUTOMATED ADAPTATION OF BUSINESS PROCESS TRACKING AND COMMUNICATIONS

(71) Applicant: Radaptive, Inc., Belmont, CA (US)

(72) Inventors: James E. Davis, Atlanta, GA (US); Balasubramaniam Ganesh, Belmont, CA (US); Kenneth L. Holmes, San Francisco, CA (US)

(73) Assignee: Radaptive, Inc., Mountain View, CA (US)

( * ) Notice: Subject to any disclaimer, the term of this patent is extended or adjusted under 35 U.S.C. 154(b) by 672 days.

(21) Appl. No.: 15/179,821

(22) Filed: Jun. 10, 2016

(65) Prior Publication Data

US 2016/0283892 A1 Sep. 29, 2016

Related U.S. Application Data

(63) Continuation of application No. 12/463,214, filed on May 8, 2009, now abandoned, which is a continuation of application No. 10/844,006, filed on May 11, 2004, now abandoned.

(60) Provisional application No. 60/469,932, filed on May 12, 2003.

(51) Int. Cl.
*G06Q 10/06* (2012.01)
*G06Q 10/00* (2012.01)

(52) U.S. Cl.
CPC ..... *G06Q 10/063114* (2013.01); *G06Q 10/00* (2013.01); *G06Q 10/0633* (2013.01)

(58) Field of Classification Search
None
See application file for complete search history.

(56) References Cited

U.S. PATENT DOCUMENTS

| 5,216,592 A | 6/1993 | Mann et al. | |
|---|---|---|---|
| 5,448,702 A * | 9/1995 | Garcia, Jr | G06F 13/20 710/24 |
| 5,598,524 A | 1/1997 | Johnston et al. | |

(Continued)

FOREIGN PATENT DOCUMENTS

| EP | 1122676 | 8/2001 | |
|---|---|---|---|
| JP | 2002207768 A * | 7/2002 | ....... G06F 17/30286 |

(Continued)

OTHER PUBLICATIONS

Lee and Tamboli, Concurrent correspondent modules, 8 Annual International Phoenix Conf on Computers and Comm, pp. 300-304, 1989 https://ieeexplore.IEEE.org/abstract/document/37404 (Year: 1989).*

(Continued)

*Primary Examiner* — Octavian Rotaru
(74) *Attorney, Agent, or Firm* — Sheppard, Mullin, Richter & Hampton LLP

(57) ABSTRACT

A data driven workflow solution that normalizes business communications by systematically recording related business communications from disparate communications channels in a common format such that the related business communications are automatically integrated into the associated business processes and which flow solution is flexible for capturing additional data elements or to adapt to changing tasks associated with the business processes is disclosed.

18 Claims, 15 Drawing Sheets

(56) References Cited

U.S. PATENT DOCUMENTS

| | | | |
|---|---|---|---|
| 5,675,804 A * | 10/1997 | Sidik | G06F 9/45508 717/139 |
| 5,754,858 A | 5/1998 | Broman et al. | |
| 6,049,664 A | 4/2000 | Dale et al. | |
| 6,067,525 A * | 5/2000 | Johnson | G06Q 10/0637 705/7.29 |
| 6,163,704 A * | 12/2000 | Joong | H04W 4/12 455/553.1 |
| 6,202,070 B1 * | 3/2001 | Nguyen | G06F 8/61 |
| 6,246,752 B1 * | 6/2001 | Bscheider | G11B 31/00 |
| 6,272,673 B1 | 8/2001 | Dale et al. | |
| 6,356,901 B1 * | 3/2002 | MacLeod | G06F 16/254 |
| 6,400,813 B1 * | 6/2002 | Birnhak | H04Q 3/0029 370/251 |
| 6,513,045 B1 | 1/2003 | Casey et al. | |
| 6,519,642 B1 | 2/2003 | Olsen et al. | |
| 6,523,027 B1 | 2/2003 | Underwood | |
| 6,549,949 B1 | 4/2003 | Bowman-Amuah | |
| 6,684,387 B1 | 1/2004 | Acker et al. | |
| 6,708,074 B1 * | 3/2004 | Chi | G05B 19/408 700/121 |
| 6,892,192 B1 | 5/2005 | Geddes et al. | |
| 6,976,144 B1 | 12/2005 | Trefler et al. | |
| 6,999,964 B2 | 2/2006 | Graser et al. | |
| 7,103,597 B2 | 9/2006 | McGoveran | |
| 7,120,898 B2 | 10/2006 | Grover et al. | |
| 7,155,439 B2 | 12/2006 | Cope | |
| 7,168,045 B2 | 1/2007 | Fliess et al. | |
| 7,266,764 B1 | 9/2007 | Flam | |
| 7,516,137 B1 | 4/2009 | Earle et al. | |
| 8,752,030 B1 * | 6/2014 | Chen | G06Q 10/0633 717/121 |
| 2001/0025372 A1 | 9/2001 | Vermeire et al. | |
| 2002/0010700 A1 * | 1/2002 | Wotring | G06F 16/258 |
| 2002/0015480 A1 * | 2/2002 | Daswani | H04L 65/1101 707/E17.119 |
| 2002/0038449 A1 | 3/2002 | Green et al. | |
| 2002/0055932 A1 * | 5/2002 | Wheeler | G06F 16/25 |
| 2002/0095650 A1 | 7/2002 | Green et al. | |
| 2002/0104067 A1 | 8/2002 | Green et al. | |
| 2002/0161734 A1 | 10/2002 | Stauber et al. | |
| 2002/0165867 A1 | 11/2002 | Graser et al. | |
| 2002/0173970 A1 | 11/2002 | Hamada | |
| 2002/0178342 A1 * | 11/2002 | Noguchi | G06F 16/20 712/1 |
| 2002/0186257 A1 * | 12/2002 | Cadiz | G06F 16/9535 715/838 |
| 2003/0004897 A1 | 1/2003 | Smith | |
| 2003/0014617 A1 * | 1/2003 | Tamboli | G06F 16/258 713/1 |
| 2003/0036934 A1 | 2/2003 | Ouchi | |
| 2003/0041126 A1 * | 2/2003 | Buford | G06Q 10/107 709/220 |
| 2003/0046130 A1 | 3/2003 | Golightly et al. | |
| 2003/0046261 A1 | 3/2003 | Baker | |
| 2003/0074463 A1 | 4/2003 | Swartz et al. | |
| 2003/0083947 A1 | 5/2003 | Hoffman et al. | |
| 2003/0101158 A1 * | 5/2003 | Pinto | H04L 49/90 |
| 2003/0114163 A1 | 6/2003 | Bickle et al. | |
| 2003/0149714 A1 | 8/2003 | Casati et al. | |
| 2003/0174155 A1 * | 9/2003 | Weng | H04M 3/4938 715/700 |
| 2003/0182287 A1 | 9/2003 | Parlanti | |
| 2003/0200486 A1 * | 10/2003 | Marwaha | H04L 41/0686 714/39 |
| 2003/0200533 A1 | 10/2003 | Roberts et al. | |
| 2003/0208378 A1 * | 11/2003 | Thangaraj | G16H 30/40 705/2 |
| 2003/0212990 A1 | 11/2003 | Brodkorb et al. | |
| 2003/0233385 A1 * | 12/2003 | Srinivasa | G06F 9/466 718/1 |
| 2004/0001103 A1 | 1/2004 | Fliess et al. | |
| 2004/0059701 A1 * | 3/2004 | Fedorov | H04M 3/5183 |
| 2004/0064805 A1 | 4/2004 | Sparago et al. | |
| 2004/0128646 A1 | 7/2004 | Jindal et al. | |
| 2004/0162741 A1 * | 8/2004 | Flaxer | G06Q 10/10 705/7.26 |
| 2004/0162857 A1 | 8/2004 | Butts | |
| 2004/0176968 A1 | 9/2004 | Syed et al. | |
| 2004/0181685 A1 * | 9/2004 | Marwaha | H04L 41/0686 726/22 |
| 2004/0181753 A1 * | 9/2004 | Michaelides | G06F 16/258 715/249 |
| 2004/0187140 A1 | 9/2004 | Aigner et al. | |
| 2004/0204947 A1 | 10/2004 | Li et al. | |
| 2005/0027667 A1 * | 2/2005 | Kroll | G06Q 20/02 |
| 2005/0075968 A1 | 4/2005 | Apostolides | |
| 2005/0187867 A1 * | 8/2005 | Sokolic | G06Q 20/22 707/E17.119 |
| 2005/0216421 A1 * | 9/2005 | Barry | H04L 43/06 705/64 |
| 2006/0004887 A1 | 1/2006 | Schenk | |
| 2006/0060123 A1 * | 3/2006 | Harrie | B63C 11/26 114/221 R |
| 2009/0024507 A1 | 1/2009 | Sabarish et al. | |
| 2014/0040223 A1 * | 2/2014 | Andreasen | G06F 16/951 707/705 |

FOREIGN PATENT DOCUMENTS

| | | | | |
|---|---|---|---|---|
| WO | WO-9833125 A1 * | 7/1998 | | G06F 15/16 |
| WO | WO-2004031945 A2 * | 4/2004 | | G06F 8/30 |

OTHER PUBLICATIONS

The Workflow Management Coalition, A common object model discussion paper, wfMC-TC-1022, Jan. 1998 http://www.wfmc.org (Year: 1998).*

Pottinger, Rachel A. and Bernstein, Philip A., Merging Models Based on Given Correspondences, 29th VLDB Conference, pp. 862-873, Jan. 1, 2003 https://www.sciencedirect.com/science/article/pii/B9780127224428500811 (Year: 2003).*

Aalst, Wil van der et al., "Workflow Management: Models, Methods, and Systems," Chapter 7, Sagitta Case Study, The MIT Press, ISBN 0-262-01189-1, 2002.

Carlsen, Steinar, "Conceptual Modeling and Composition of Flexible Workflow Models," doctoral thesis, Norwegian University of Science and Technology, Dec. 15, 1997.

Microsoft Corporation, "User's Guide for Microsoft Visio 2000—Enterprise Edition: For Automated IT Design and Documentation," Part No. X05-49770, 2000.

Moore, Connie, "Planning Assumption: Best Practices in Workflow," Giga Information Group, Inc., RPA-082002-00012, Aug. 12, 2002.

Siebert, Reiner, "Process & Workflow Management—Organization and Projects," Daimler Chrysler, Dec. 7, 2001.

The Workflow Management Coalition, "A Common Object Model Discussion Paper," Document No. WfMC-TC-1022, Submitted by ICL Enterprises, Jan. 1998.

International Application No. PCT/US2004/015121, Written Opinion and International Search Report dated Jun. 30, 2008.

* cited by examiner

Project Table (Project Object)

| ProjectID | Project Description | Assignee | Create Date | Status |
|---|---|---|---|---|
| PR0016 | Upgrade Network | Bob | 1/2/2004 | Open |
| PR0022 | Update Weblogic | Joe | 2/3/2004 | Completed |

Core-Ticket Table – provides relationship between a Project and related Tasks as an example (CoreTicket Object)

Core-Ticket

| ID | Description | Task ID | RequestID | Project ID | Assignee | Create Date | Ticket Status |
|---|---|---|---|---|---|---|---|
| T10003 | Configure system | TK0001 | | PR0016 | Ken | 1/2/2004 | New |
| T10005 | Update Weblogic | TK0010 | | PR0016 | | 2/3/2004 | New |
| T10007 | Upgrade system | TK0020 | | PR0016 | | 3/3/2004 | New |

Id of the Task and it's corresponding Project is entered in the Core-Ticket Table and hence a relationship between the two tables has been established

Task Table (Task Object)

| TaskID | Task Description | Assignee | Create Date | Status |
|---|---|---|---|---|
| TK0001 | Order Cables | Ken | 1/15/2004 | Work in progress |
| TK0010 | Receive cables | | 1/15/2004 | Pending |
| TK0020 | Fix patch panel | | 1/15/2004 | Pending |

AUTOMATED ADAPTATION OF BUSINESS PROCESS TRACKING AND COMMUNICATIONS

CROSS REFERENCE TO RELATED APPLICATIONS

This application is a continuation application of U.S. application Ser. No. 12/463,214, filed May 8, 2009, which is a continuation application of U.S. application Ser. No. 10/844,006, filed on May 11, 2004, which claims benefit of Provisional Application Ser. No. 60/469,932, filed May 12, 2003; all of which are incorporated by reference in their entirety.

FIELD OF THE INVENTION

The invention relates to business process tracking and automation, and more specifically to a system that enables rapid adaptation to changing business processes by tracking all related activities and communications. Such a system provides facilities to enable on-demand execution of automation functions. Business communications can be systematically recorded in a common format regardless of whether the original format is email, instant messaging, workflow application updates, voice conference, or other technology formats. In addition, the system framework enables interaction with other workflow applications including customer relationship management (CRM), enterprise resource planning (ERP), and information technology (IT) ticketing systems.

BACKGROUND OF THE INVENTION

The acceptance of corporate instant messaging, the increasingly overwhelming volume of email, and the proliferation of enterprise workflow applications are making business communications more fragmented and inefficient. While each workflow and communications vehicle has advantages for specific types of business activities, there is no system that tracks and manages all of the related tasks and communications in a normalized form. Although integrated communications channel management has been addressed in specific niche areas, such as inbound customer communication to a call center, there is currently no holistic solution for managing disparate communications channels for any business process.

While there are many systems available to track work activities associated with a wide range of business processes, many of these systems do not capture the true work that is performed since much of the work is performed outside of the system. A great deal of the work activity typically involves communications between process participants, and since the communication is not consistently tracked, the communication needs to be entered into the system after the work has been performed.

Additionally, the available workflow systems do not provide the flexibility to keep pace with the rate of business change. Many of these systems require programming and database changes in order to capture additional data elements associated with a business process or to change what tasks are required to fulfill a specific type of service request.

Based on the foregoing, there is a need for a business tracking system that provides for systematically recording business communications from disparate communications channels in a common format such that business communications is automatically integrated into the associated business processes and for flexibility to capture additional data elements or to adapt to changing tasks associated with the business processes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates the manner in which the Relationship object functions, according to certain embodiments;

FIG. 14 shows the detailed task interface that presents all of the attributes, messages and relationships associated with a single task, according to certain embodiments;

DETAILED DESCRIPTION OF THE PREFERRED EMBODIMENT

Figure 1:
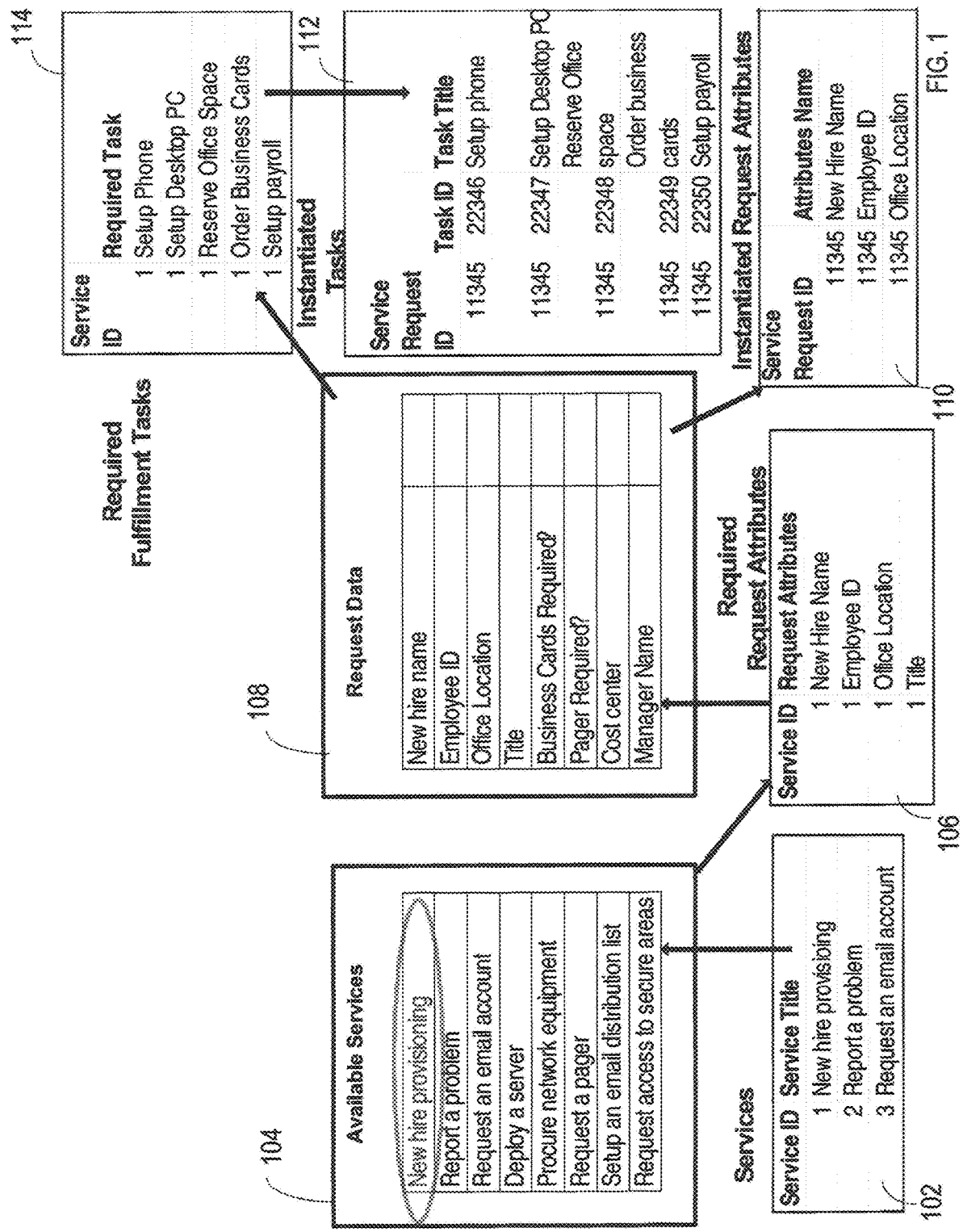
FIG. 1 is a high level diagram illustrating a manner in which control data drives a request interface and consequent fulfillment tasks that are spawned, according to certain embodiments.

A data driven workflow solution that normalizes business communications by systematically recording related business communications from disparate communications channels in a common format such that the related business communications are automatically integrated into the associated business processes and which flow solution is flexible for capturing additional data elements or to adapt to changing tasks associated with the business processes is described.

In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Business process tracking and automation is made possible by a common object model and an associated unified user interface. The common object model include key objects such as core objects that provide relations ships between other core objects and/or a standard sets of objects, relationship objects for defining the relationships between objects, and message objects for providing unified messaging. Such a common object model not only provides a unified view of all related components within the model, but also provides a data driven work flow solution for the given business process and automation.

According to certain embodiments, a system is used for establishing a common data model to track and manage all forms of service requests, tasks, data objects and related business communications. In order to provide a data driven workflow solution, the system is designed to enable data updates to drive the following: The information that is collected based on the type of service requested; The tasks, and related dependencies, that are created based on the type of service that has been requested; The information that needs to be collected for each specific type of task; The automation functions that should be executed based on specific events; The automation functions that should be available to the task assignee based on the task type; The validation criteria of any data element; The notifications that should be sent based on specific events.

All system communications are normalized to a common structure that includes two high-level objects, a core object, and a message object. There are different types of core objects. The different types of core objects include:

1) Core-ticket object;
2) Core-group object;
3) Core-other object;
4) Core-assets object;
5) Core-documents object;
6) Core-people object.

The above different types of core objects are merely illustrative. The different types of core objects depend on the particular business needs of a project or company and thus may vary from implementation to implementation. The present invention is not limited to any particular type of core objects. The different core objects are described in greater detail herein with reference to FIG. 2, FIG. 6, FIG. 7, FIG. 8, FIG. 9 and FIG. 10.

Core objects provide a framework for relationships between a standard set of objects. Core objects can also provide a framework for relationships between other core objects. The standard set of objects can include objects such as a Request object, Project object, Task object, and Approvals object. The standard set of objects is described in greater detail with reference to FIG. 2. The above standard set of objects is merely illustrative. The standard set of objects depends on the particular business needs of a project or company, and thus may vary from implementation to implementation. The present invention is not limited to any particular standard set of objects.

Another key component for maintaining a stable data model is the mechanism for establishing relationships between objects. Such a mechanism is referred to herein as a relationship object. The relationship object manages data-driven control over certain types of object relationships without the need for modifying existing data structures. Relationships and relationship objects are described in greater detail herein with reference to FIG. 3, FIG. 5, FIG. 11, FIG. 12, and FIG. 14.

Yet another key system component is the mechanism that provides unified messaging. Such a mechanism is referred to herein as a message object. The foundation for the unified messaging component is the standard set of objects that represent the common denominator of any form of communications. Message objects are tied to a core object and can be instantiated by any combination of communication channels including email, instant messages, voice mail, or work flow application entries. Unified messaging and message objects are described in greater detail herein with reference to FIG. 2, FIG. 4, FIG. 13 and FIG. 14.

The system's unique capabilities stem from its common object model for managing communications and from its data-driven approach to managing business process tracking and automation. The system provides the basis for a common automation platform and unified user interface that can significantly increase user productivity and quality of collected business information.

Administration interfaces (user interfaces) allow authorized users to modify the control data in such a system. Such an approach allows rapid adaptation to changing business processes without the need for additional programming. The system is designed to maintain common intuitive interfaces for users making requests or for working the ensuing tasks.

The user interfaces of the system can be web-based, i.e., HTML-based user interfaces. The user interfaces of the system are based on four primary user roles:

Requester interface—The requester interface focuses on a data-driven wizard interaction for maximum efficiency and ease of use.

Worker interface—The worker interface is based on providing embedded communications and tools to enable users to perform much of their work within the context of the system. When work is performed within the context of the system, the work is simultaneously documented automatically as the work is being performed, thus obviating the need to manually document the work after the work is performed.

Management interface—The management interface is focused on providing access to comprehensive business process metrics.

Administrator interfaces—The administrator interfaces include a system administrator interface, a process administration interface, and a departmental administrator interface. Such administrator interfaces enable system, process, and departmental control data to be managed by designated administrative personnel.

According to certain embodiments, the worker interface is designed around the normalized project, request, task, message, and relationship objects. The worker interface leverages the common object structures in order to provide the user with a unified display. Such a unified display enables a single interface for communications and invocation of automation facilities for any type of task The system administrator interface enables the creation of business rules using a form-based wizard. Such business rules implement event-based data validation, system notification and automation.

The process administrator interface enables control data to be modified for controlling the types of requests that will be presented, the data elements that are required for submitting a particular type of request, and what tasks will be generated to fulfill that request.

The departmental administrator interface will allow control data to be modified that determines what data elements are required for specific types of tasks, what individuals are members of which workgroups, and which users have authority to approve requests for a given department.

The application framework is illustrated in FIG. 1. FIG. 1 shows by way of example, the manner in which control data drives the request interface and the fulfillment tasks that are consequently spawned. The example demonstrates the manner in which dynamic data drives the workflow system. The requester is presented with a list of choices 104 generated from a Request object 102. Once a specific service is selected from list of choices 104, the system checks the data elements required for the selected service in the Required Request Attributes object 106. A page 108 is dynamically generated from this data to solicit the required data from the user. When the data is provided by the user, the data values are captured in the Instantiated Request Attributes object 110.

In addition to instantiating the attribute values for the request, tasks are instantiated in the Instantiated Tasks object 112 based on values specified for the particular type of request in the Required Fulfillment Tasks object 114. Task attributes are then collected using a similar technique thus allowing a greater level of customization to take place by using control data and dynamically created application pages, with no need for additional programming or changing the underlying data structures.

Figure 2:
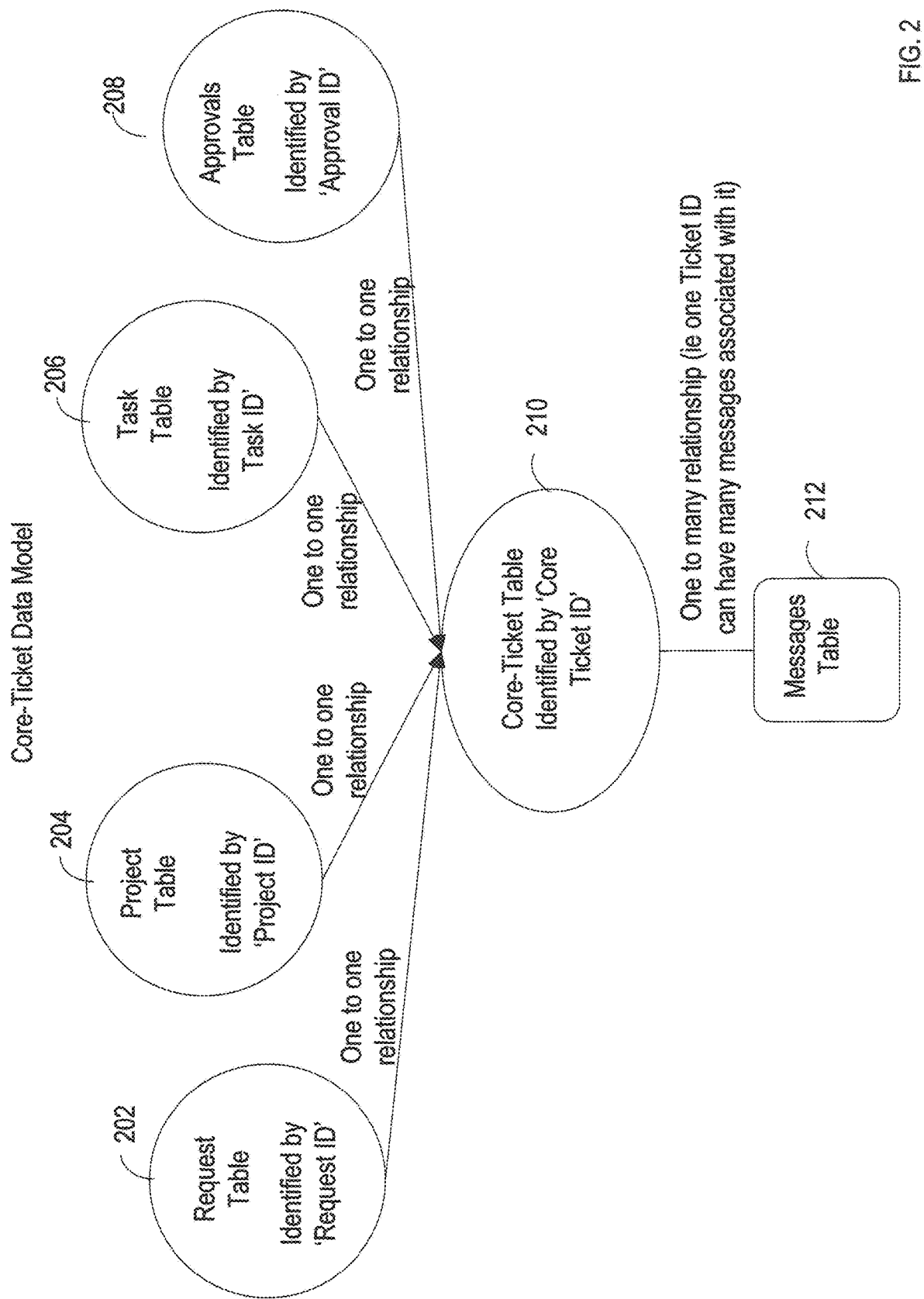
FIG. 2 is a simple high level conceptual diagram illustrating key object classifications in a Core Object model.

FIG. 2 illustrates key object classifications in a Core Object model, according to certain embodiments. Objects are used for logical description of an entity such as a Ticket. FIG. 2 shows a core object such as Core-Ticket Object 210 that provides for relationship between other objects such as Request table 202, Project table 204, Task table 206 and Approvals table 208. An object will correspond to a table in a relational database, hence the terms Object and Tables are used interchangeably. Other examples of objects are Human Resource Application tables, Peoplesoft Application table, SAP Inventory Manager table, etc.

Each object is identified by an object ID. For example, the Core-Ticket table 210 is identified by a core-ticket ID, the Request table 202 is identified by a Request ID, the Project table 204 is identified by a project ID, etc. Further, each table (object) includes a plurality of attributes. Attributes of the Project, Request, Task and Approvals Tables (objects) may be change as needed. At a minimum, the tables contain attributes corresponding to the Core Ticket table. There is a one-to-one relationship between each attribute in a given table to a corresponding attribute in the Core table.

There can be as many Tasks and Approval record entries in the Core Ticket Table. The message table 212 is an object that represents a distinct contribution to any type of a record in one or more tables related to the Core Ticket table such as the Project, Request, Approval or Task tables. There is a one-to-many relationship between a given core object and message object. For example, in FIG. 2, the given Core-ticket table can have many messages associated with it. The Messages table contains a list of all the messages that are generated in the application. The sources for Messages are Email, Instant Message clients, Fax and Voice.

A Relationship object exists for every Core Object to enable a typed, many-to-many relationship with any other Core Object. The Relationship object is covered in greater detail herein with reference to FIG. 3, FIG. 5, FIG. 11, FIG. 12, and FIG. 14.

Figure 3:
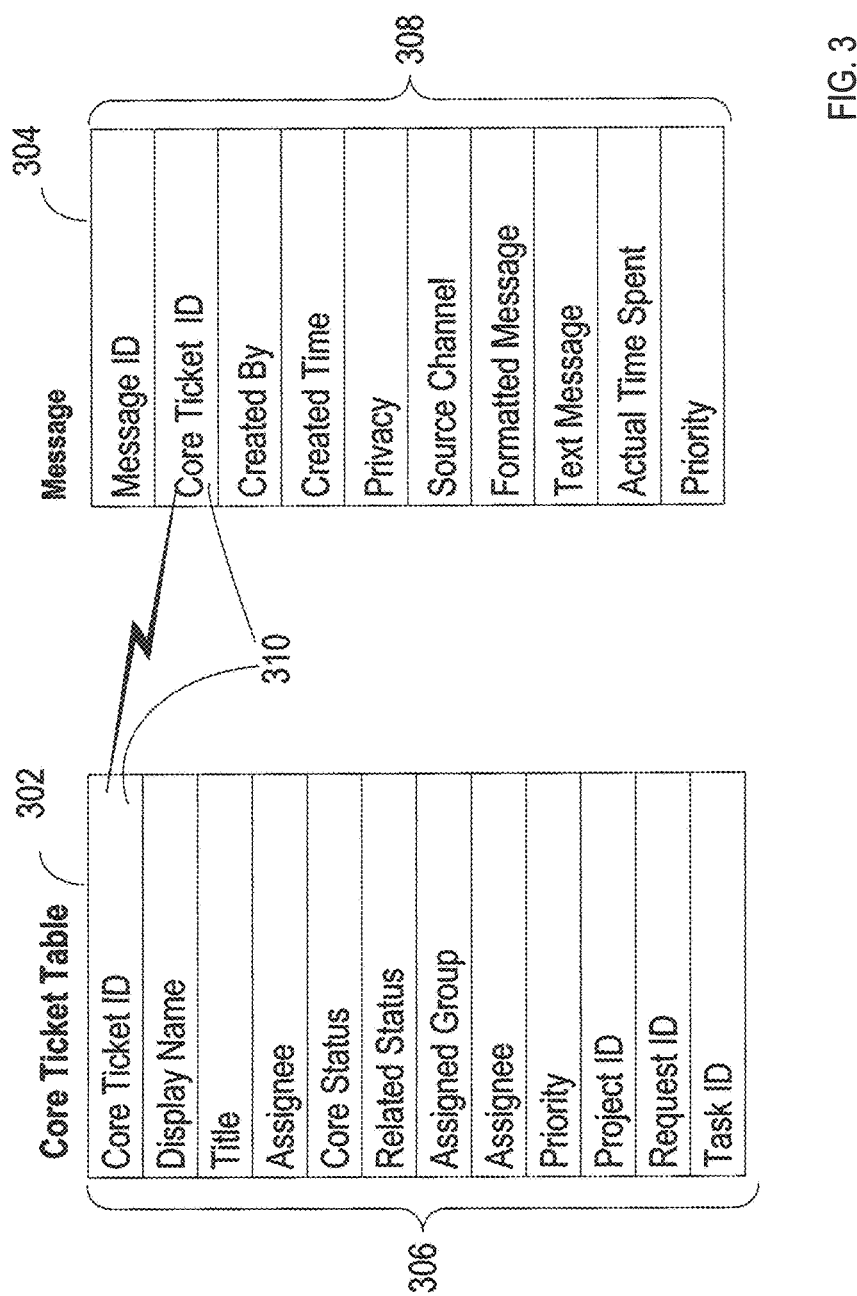
FIG. 3 illustrates sample attributes of the Core-Ticket object and the Message object, according to certain embodiments.

FIG. 3 illustrates sample attributes of the Core-Ticket object and the Message object, according to certain embodiments. Core ticket table 302 includes attributes such as attributes 306. Message table 304 includes attributes such as attributes 308. Message table 304 is related to Core-ticket table 302 because the core-ticket ID 310 appears in both Core ticket table 302 and Message table 304. Such core attributes are consistent across every instantiation of the related objects and Message object, regardless of whether the objects are created by the system's request interface, a real-time messaging interface, or an external system API. For any external system, such as email or an external workflow application, a mapping table is used to map the external system's data structures to the system's thread (records) and message object format.

Figure 4:
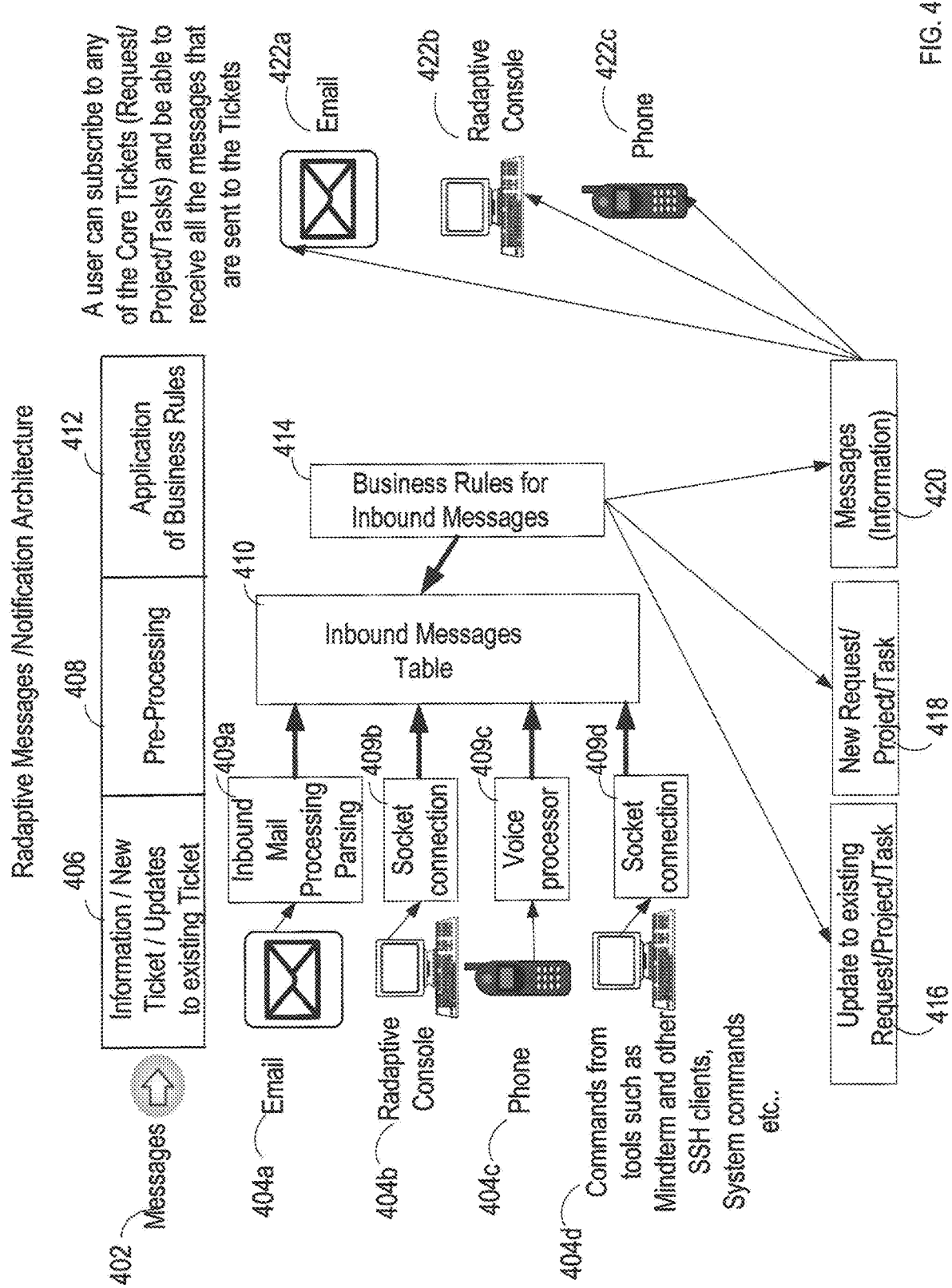
FIG. 4 is a schematic illustration of the Messaging architecture that provides an integrated messaging framework for uniform messaging capabilities, according to certain embodiments.

FIG. 4 is a schematic illustration of the Messaging architecture that provides an integrated messaging framework for uniform messaging capabilities, according to certain embodiments. In FIG. 4, incoming messages 402 are system or manually generated information that is sent or updated directly into the system. Messages 402 can be from any message type such as message types 404a-d. The incoming messages 402 are used for an input or update flow process 406. The incoming messages 402 are then sent through a pre-processing flow 408 (i.e., converted to an appropriate format). Examples of pre-processing include mail processing parsing 409a, socket connections 409b, 409d, and voice processing 409c. The inbound messages 402 are stored in inbound message table 410. A flow process 412 for applying business rules 414 is applied to the inbound messages 402 stored in message table 410. Sample results from applying business rules 414 to the inbound messages 402 are updates 416 to existing requests/projects/tasks, creations 418 of new requests/projects/tasks, storage 420 of the messages in the relevant message tables associated with the given core object. Further, notifications 422a-c are sent based on subscriptions.

The following are examples of message types:

1. An email can be sent to the system by a user in order to create a new Request for obtaining a new piece of equipment. In this example, the text of the Email body will be stored in the Messages Table 2. A user may like to post a question on the system Console related to the Project that he/she is working on.

3. A user may like to capture a conference call with respect to a problem and store the conference call along with the associated Task that was generated in the system to track the problem. The conference call can be saved as a wave file and then attached to the associated task.

4. A user may like to store all the Unix commands that were issued in an SSH client to fix a hardware problem and then store the issued commands along with a Task that was created in the system to track the hardware problem.

For purposes of explanation, assume that a user reports a new problem via email and the new problem needs to be tracked in the system. In such a case, the business rules are designed to automatically generate a new Task from the email from the user. In another example, assume that a user sends a detailed description in the body of the email regarding a problem that has already been logged and tracked in the system. In such a case, the email body is parsed and stored in the Messages table with a reference to the problem identified by a Task ID.

Further, a user can subscribe to a topic by selecting the appropriate record from the system Console. A topic can be a Project, Request or Task. Subscription to a topic indicates to the system that it must inform the user of any new messages that have been posted to that particular topic. Generally, all the messages that are posted to a particular topic (Project, Request or Task) will be displayed in the Messages window of the system Console. A user can reply to the messages via the console. The reply will be treated as an inbound message to the system.

The following table illustrates sample attributes of a ticket-core object. In other words, the core-ticket object refers to a table, in the relational database, called "Core Ticket" with the following attributes:

| Column Attribute | Type | Description |
| --- | --- | --- |
| Core Ticket ID | Integer | |
| Display Column | String | Column Name that needs to be displayed when the details of the Ticket is exposed to a user such as in a query |
| Title | String | |
| Assignee | String | |
| Owner | String | |
| Create Date | Date/Time | |
| Last Update | Date/Time | |
| Project ID | Integer | |
| Request ID | Integer | |
| Task ID | Task ID | |
| Ticket Type | String | |
| Core Status | String | Describes the current condition of the Ticket. For example, if this were an entry for a related Task, the Ticket status could be 'In progress' |
| Related Status | String | Describes the current condition of the related item. For example, if this were an entry for a related Task, the Related Status could be 'Need Approval' |
| Source | String | Describes the origin of the data - manual or system generated |
| Assigned Group | String | |
| Priority | Integer | |

FIG. 5 illustrates the manner in which the Relationship object functions, according to certain embodiments. For purposes of explanation, assume that FIG. 5 shows the relationship between a Project and its associated Tasks. The Project records are stored in a Project Table and the Tasks in a Task Table. The Core-Ticket Table is used to relate the Project and its corresponding Tasks by creating an entry in the Core-Ticket Table for each Task record along with its Project ID's. The relationship must be implemented by storing the unique identifiers of the entries in the tables to be related, into a common table. Since the Project consists of 3 Tasks, there are 3 records in the Core-Ticket Table with the same Project ID (PR0016). Thus, in FIG. 5, the objects that are to be related are project table 502 and task table 506. The common table is core-ticket table 504. As an example, project id 508 "PR0016" in project table 502 is related to the associated tasks 510 shown in the task table 506 by entries in the core-ticket table 504, Thus, in core-ticket table 504, the task ID column 514 is populated with task IDs TK001, TK0010, TK0020 that correspond to project ID PR0016 as shown in project ID column 516 in core-ticket table 504.

By abstracting the relationship information into its own object, there is a level of insulation between the application logic and the underlying data model. Such a method eliminates required changes to the core data model when new objects, or new types of relationships, are introduced. Such an approach to managing relationships is consistent with the other aspects of the system that allow control data to customize the functionality provided by the system's applications.

Figure 6:
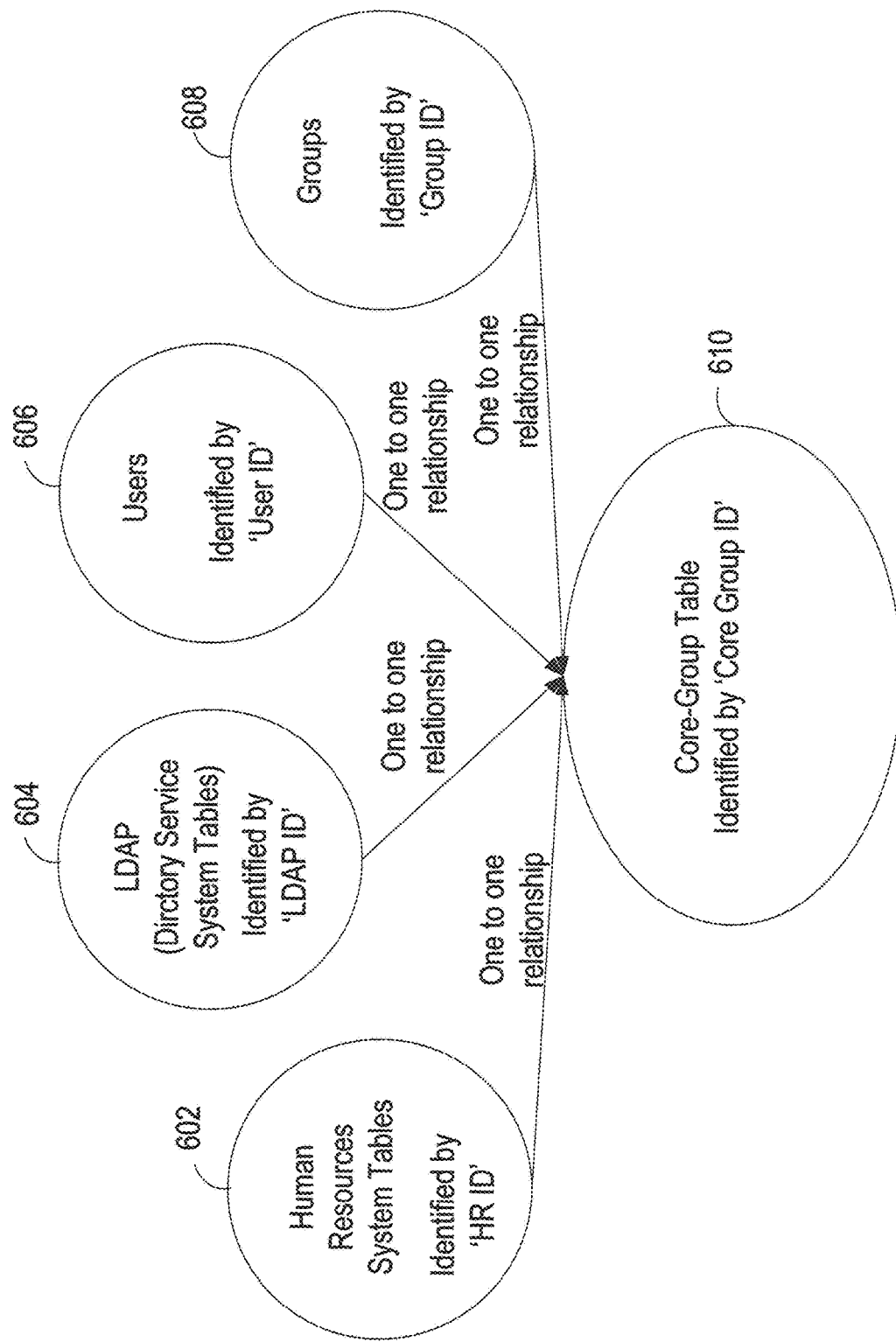
FIG. 6 illustrates a Core-Group table and the objects that the Core-Group table relates, according to certain embodiments.

FIG. 6 illustrates a Core-Group table 610 and the objects that the Core-Group table relates, according to certain embodiments. Core-Group table 610 contains relationship information between Human Resources System tables 602, LDAP based Directory system tables 604, Users table 606 and Groups table 608. Each of the objects (tables) has at least one record in the Core-Groups Table. Attributes of the Human Resources System tables 602, LDAP based Directory system tables 604, Users table 606 and Groups table 608 can be defined depending on the needs of the business. At a minimum, such tables (objects) contain attributes corresponding to the Core-Groups table 610. Each table is identified by a unique system generated id. Relationships between the Human Resources System table 602, LDAP based Directory system table 604, Users table 606 and Groups table 608 are provided by the Core Groups Table in a fashion as previously explained with reference to the Core-ticket example of FIG. 5.

Figure 7:
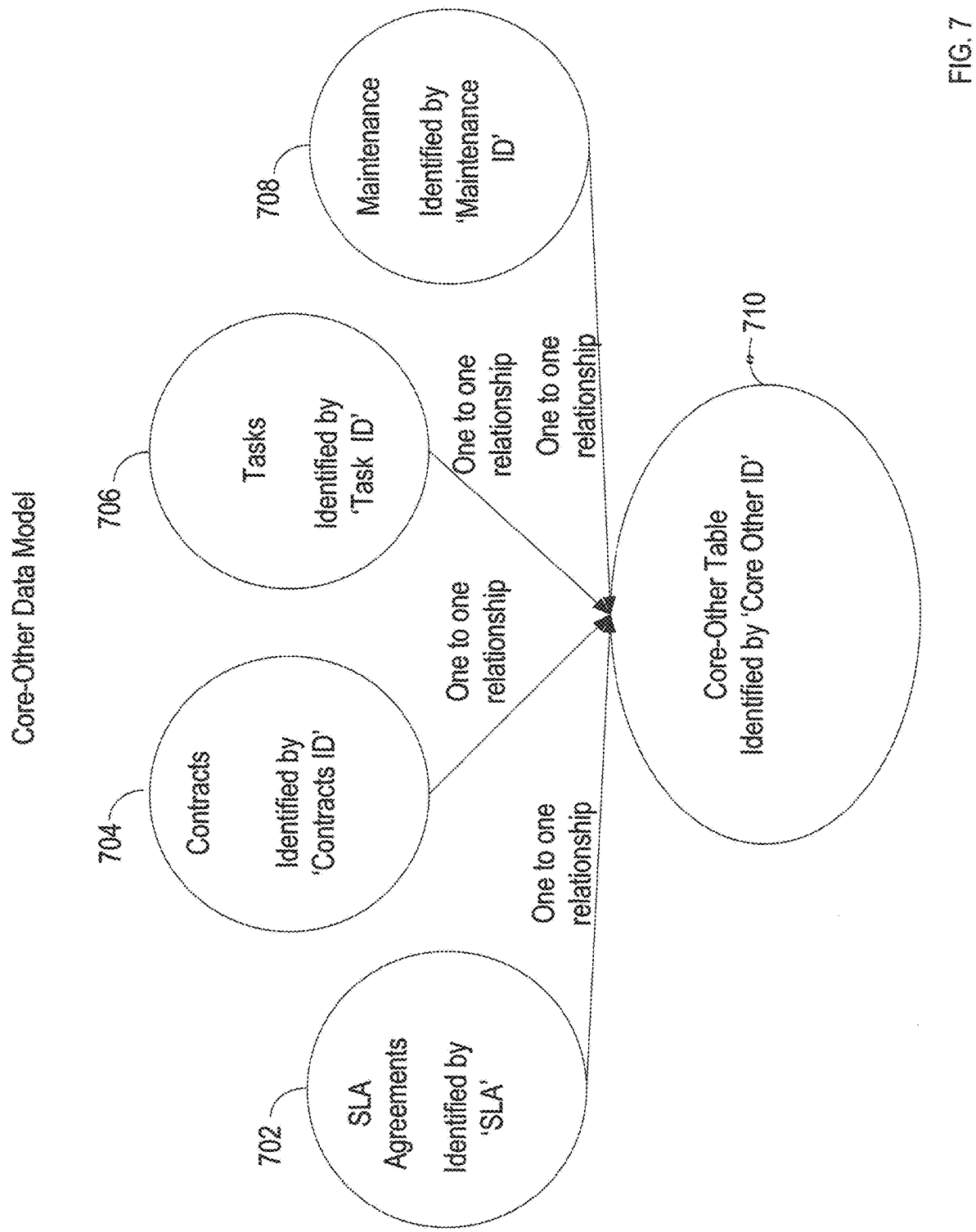
FIG. 7 illustrates a Core-Other table 710 and the objects that the Core-Other table relates, according to certain embodiments.

FIG. 7 illustrates a Core-Other table 710 and the objects that the Core-Other table relates, according to certain embodiments. Core-Other table 710 contains relationship information between SLA Agreements table 702, Contracts table 704, tasks table 706, and maintenance agreements table 708. Each object has at least one record in the Core-Other Table. Attributes of the SLA Agreement table, Contracts table, Task and Maintenance Agreements will be defined as needed. At a minimum, the objects contain attributes corresponding to the Core-Other table. Each table is identified by a unique system generated id. Relationships between the SLA Agreements, Contracts, Tasks and Maintenance agreements objects are provided by the Core-Other Table in a fashion as previously explained with reference to the Core-ticket example of FIG. 5.

Figure 8:
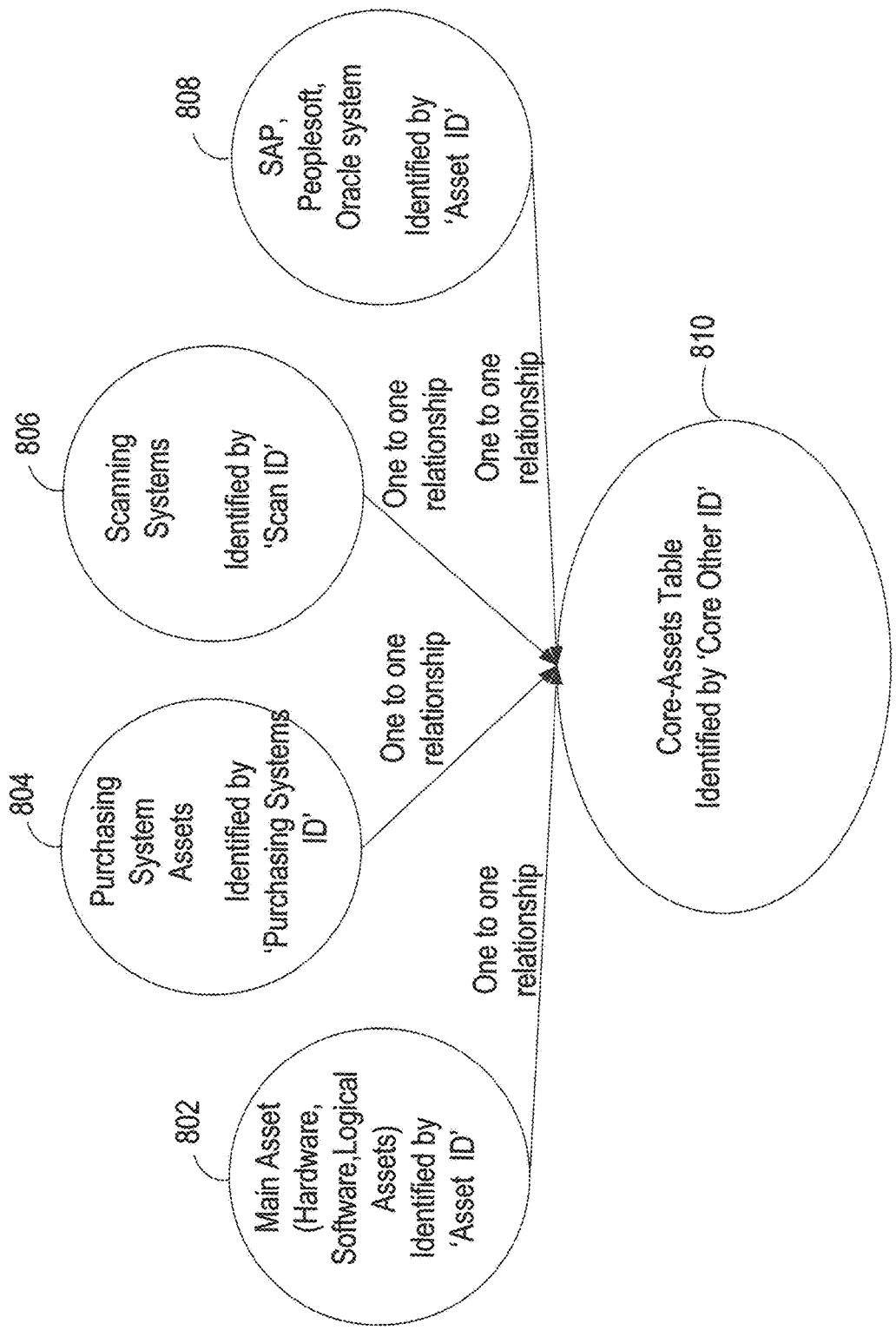
FIG. 8 illustrates a Core-Assets table and the objects that the Core-Assets table relates, according to certain embodiments.

FIG. 8 illustrates a Core-Assets table 810 and the objects that the Core-Assets table relates, according to certain embodiments. Core-Assets table 810 contains relationship information between main asset table 802, Purchasing System asset table 804, Asset Scanning Systems table 806, and SAP/PeopleSoft/Oracle Financial Applications/or other systems tables that maintain Inventory information 808. The Relationships are maintained by 'Main asset ID', 'Purchasing System ID', 'Scan ID' and 'Asset ID'. Each object has at least one record in the Core-Assets Table. Attributes of the Main assets table, Purchasing System table, Asset Scanning Systems table, and SAP/PeopleSoft/Oracle Financial Applications/or other systems tables can defined based on the business needs at hand. At a minimum, the tables contain attributes corresponding to those in the Core-Assets table. Each table is identified by a unique system generated id. Relationships between the main assets table, Purchasing System table, Asset Scanning Systems table, SAP/PeopleSoft/Oracle Financial Applications/or other systems tables are provided by the Core Assets Table in a fashion as previously explained with reference to the Core-ticket example of FIG. 5.

Figure 9:
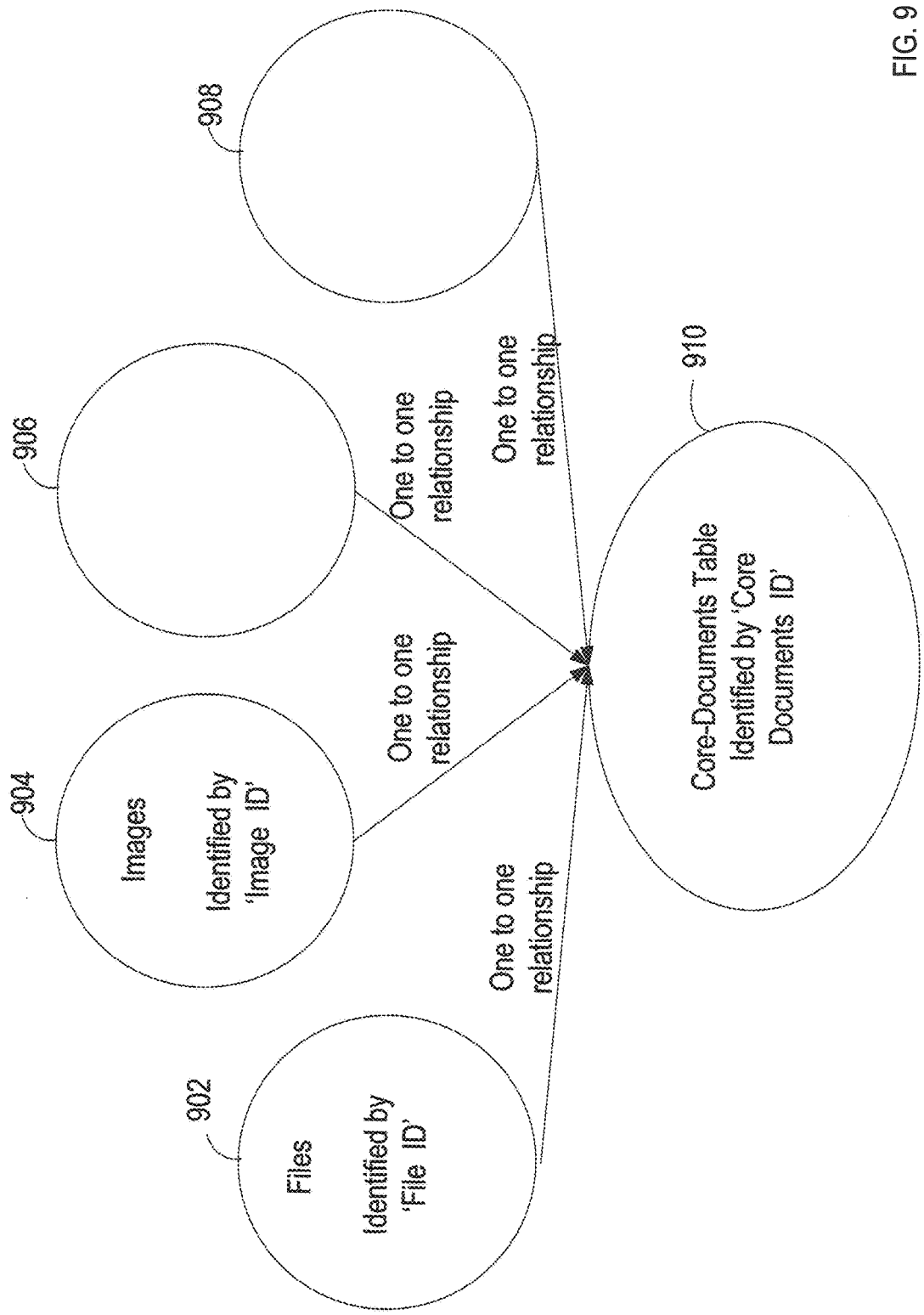
FIG. 9 illustrates a Core-Documents table and the objects that the Core-documents table relates, according to certain embodiments.

FIG. 9 illustrates a Core-Documents table 910 and the objects that the Core-documents table relates, according to certain embodiments. Core-documents table 910 contains relationship information between Files table 902, Images table 904 and other Documents objects 906, 908 such as faxes, manuals, etc. Relationship is maintained by 'File ID', 'Image ID', etc. Each object has at least one record in the Core-Documents Table. Attributes of the Files and Images Table can be defined based on the business needs at hand. At a minimum, the tables contain attributes corresponding to those in the Core Documents table. Each table is identified by a unique system generated id. Relationships between the Files table, Images table, etc are provided by the Core- Documents Table in a fashion as previously explained with reference to the Core-ticket example of FIG. 5.

Figure 10:
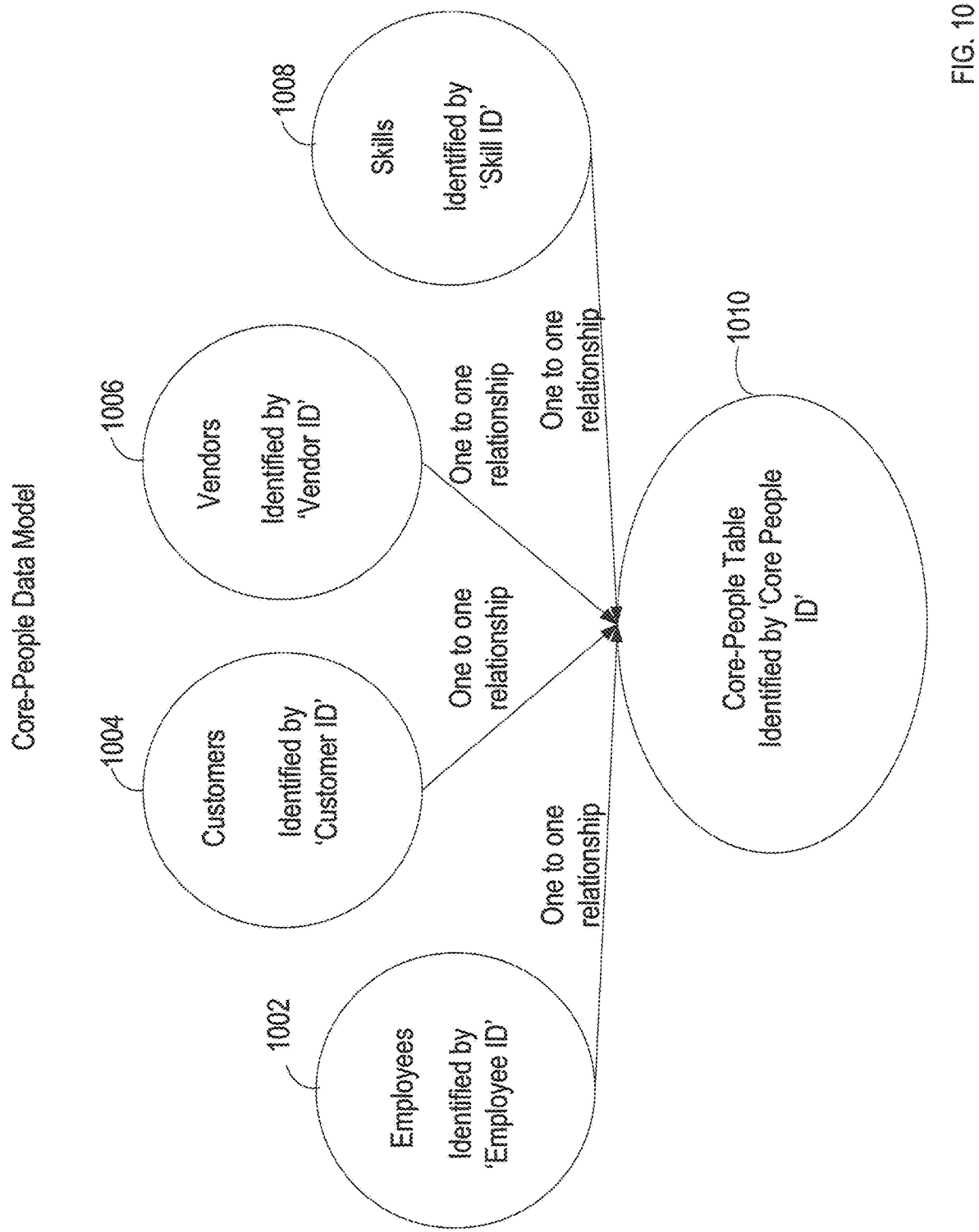
FIG. 10 illustrates a Core-People table and the objects that the Core-People table relates, according to certain embodiments.

FIG. 10 illustrates a Core-People table 1010 and the objects that the Core-People table relates, according to certain embodiments. Core-People table 1010 contains relationship information between Employees table 1002, Customers table 1004, Vendors table 1006 and Skills table 1008. Relationship is maintained by 'Employee ID', 'Customer ID', 'Vendor ID' and 'Skill ID'. Each object has at least one record in the Core-People Table. Attributes of the Employees, Customers, Vendors and Skills Tables can be defined based on the business needs at hand. At a minimum, the tables contain attributes corresponding to those in the Core-People table. Each table is identified by a unique system generated id. Relationships between the Employees, Customers, Vendors and Skills objects are provided by the Core-People Table in a fashion as previously explained with reference to the Core-ticket example of FIG. 5

Figure 11:
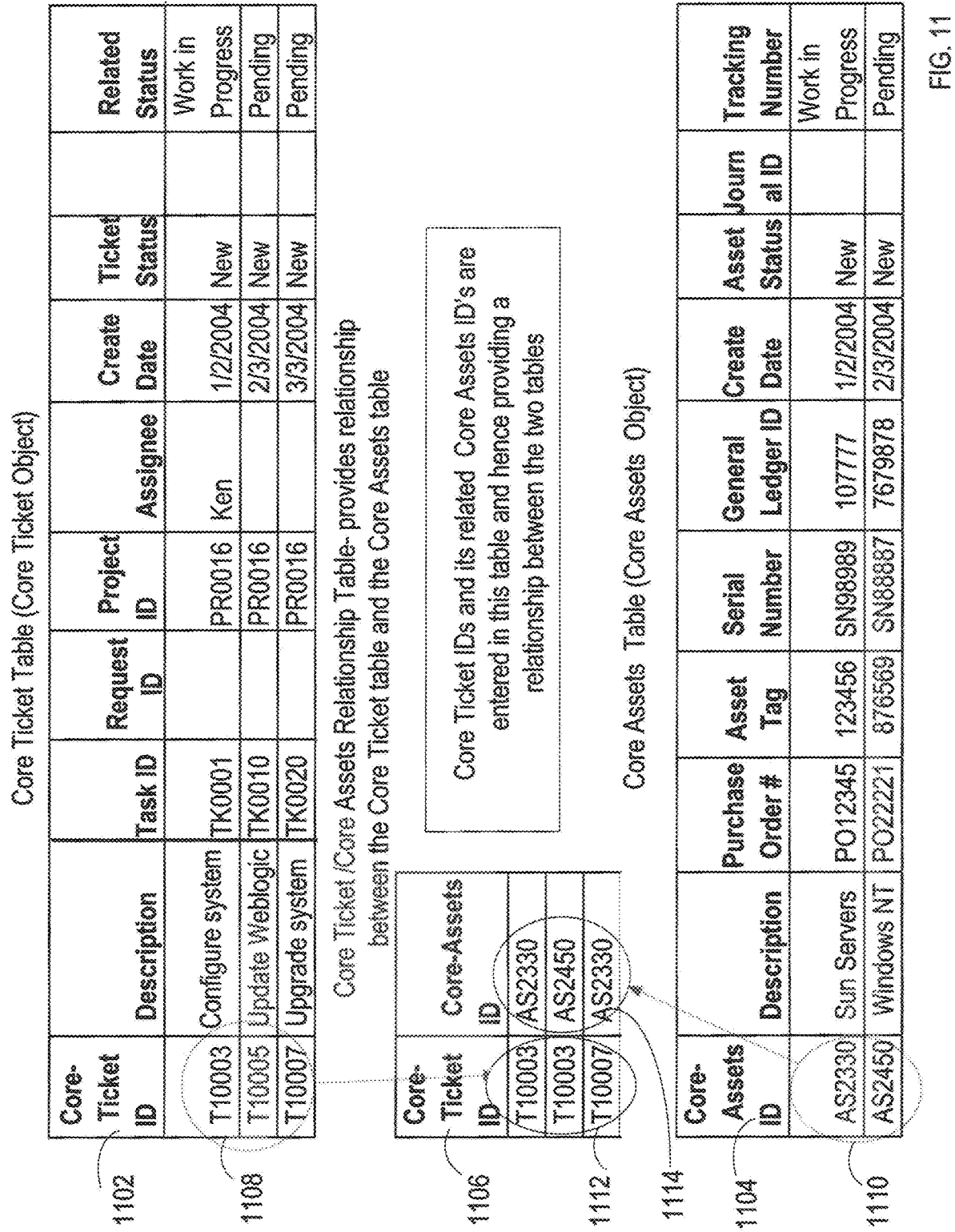
FIG. 11 shows the relationship between Core objects, according to certain embodiments.

It may be necessary to relate Core tables so that related information can be presented to the end user. For purposes of explanation, assume that a user may be interested in finding all the 'Assets' such as Hardware, Software, etc., that are related to a given Ticket. This can be achieved by providing a relationship between the Core-Ticket Table and the Core Assets table. FIG. 11 shows the relationship between Core objects, such as Core Ticket table 1102 and the Core Assets table 1104. In FIG. 11, such a relationship is shown in the relationship table 1106. Relationship table 1106 contains the Core Ticket ID 1112 and the corresponding Core Assets ID 1114. Core Ticket ID 1112 is the same as Core Ticket ID 1108. Similarly, Core Assets ID 1114 is the same as Core Assets ID 1110. The relationship table 1106 has a many-to-many relationship with the Core Ticket table 1102 and Core Asset Table 1104. The same concept can be applied in order to provide relationships between other Core tables (objects).

Figure 12:
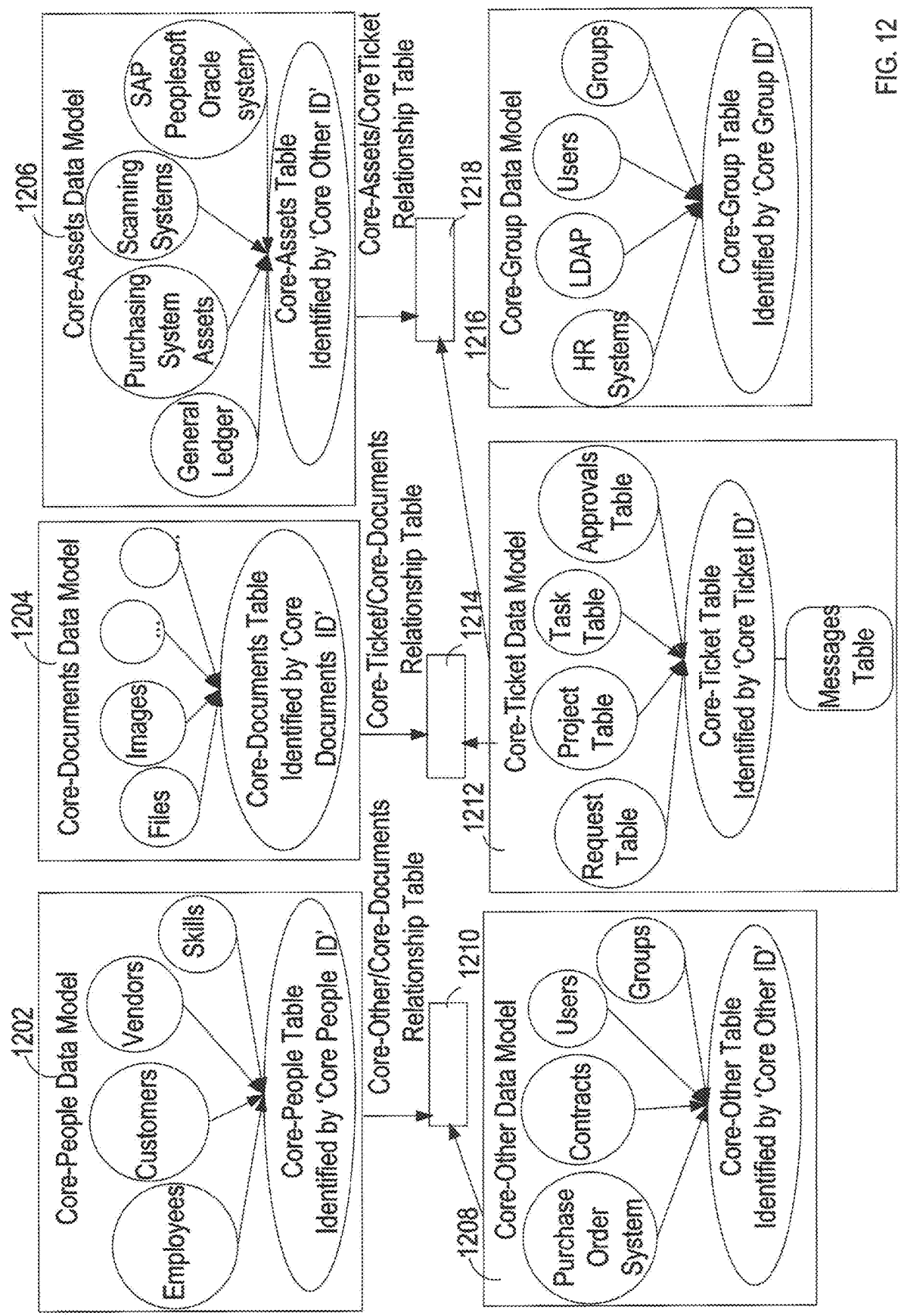
FIG. 12 illustrates a composite view if different core objects that are related by relationship tables, according to certain embodiments.

FIG. 12 illustrates a composite view if different core objects that are related by relationship tables. FIG. 12 shows a core-people table 1202, a core-documents table 1204, a core-assets table 1206, a core-other table 1208, a core-ticket table 1212, and a core-group table 1216. Relationship table 1210 contains relationship information that relates core-people table 1202 and core-other table 1208 Similarly, relationship table 1214 contains relationship information that relates core-documents table 1204 and core-ticket table 1212. Relationship table 1218 contains relationship information that relates core-assets table 1206 and core-group table 1216.

Integration of Tools such as MindTerm and other Unix Terminal Emulators

MindTerm is a software tool that allows for a SSH Session (Secure Shell Session) via an Applet. A SSH client is also referred to as a work-assist tool. This is similar to running exceed or SecureCRT terminal emulation software. According to certain embodiments, the system provides the ability of invoking MindTerm and other such emulators from within the System such that the associated interactions such as commands that are issued via the Terminal sessions logged in a Messages Table. The MindTerm tool can be launched from the 'Related window' of the system Console, as illustrated in FIG. 14 herein.

Figure 14:
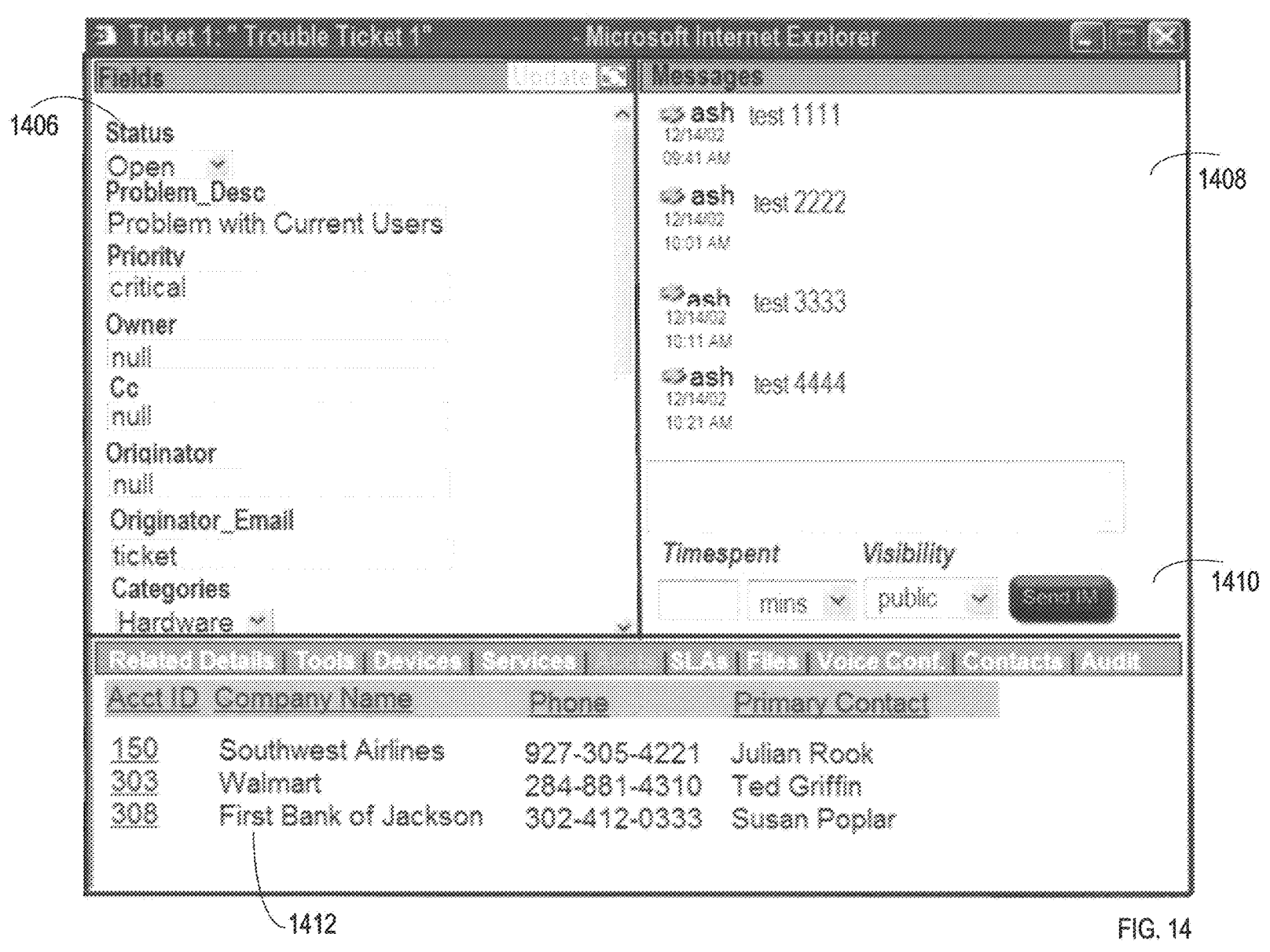

The information that is stored in the Messages Table can then be displayed on the Messages Window as shown in FIG. 14 herein. There are various options that can be specified for the interaction with MindTerm such as the ability to specify the option for capturing user issued commands, output from the command and specifying the number of the commands that can be captured.

The following steps comprise the process flow capturing information when using integration tools.

1. A user invokes the system Console.

2. The user selects the tab called 'Tools' in the 'Related Details' section of the console.

3. The user then selects an option to invoke the Mind Term applet similar to a Unix Terminal window that can be used to connect to other servers via SSH (Secure Shell). Secure shell is a protocol that enables secure Terminal sessions.

4. The system the enables the capture of all the interaction (both the command input and output) that are issued to the server via the Terminal Session and store it in a database.

5. The information in the 'Messages' window of the console is then refreshed after the Terminal Session is closed (or destroyed) when the information is saved in the database.

For the Mindterm session, the operations information from the terminal session can be saved in the 3 ways as described in item 1 of the Preferences Set-up below.

Preferences Set-Up:

1. The User may set an option where he/she might want to:

a. Simply capture the last 30 lines, for example <or any number of lines and is configurable via preference settings on the Server> from the session instead of capturing all the commands.

b. Alternatively—the user may want to only highlight the commands—similar to 'Cut and Paste' to save the specific commands.

c. Saving all the commands from the session.

2. The 'Messages' window is dockable/undockable—i.e., the user has the capability to expand the Window by undocking it to cover the entire screen.

Figure 15:
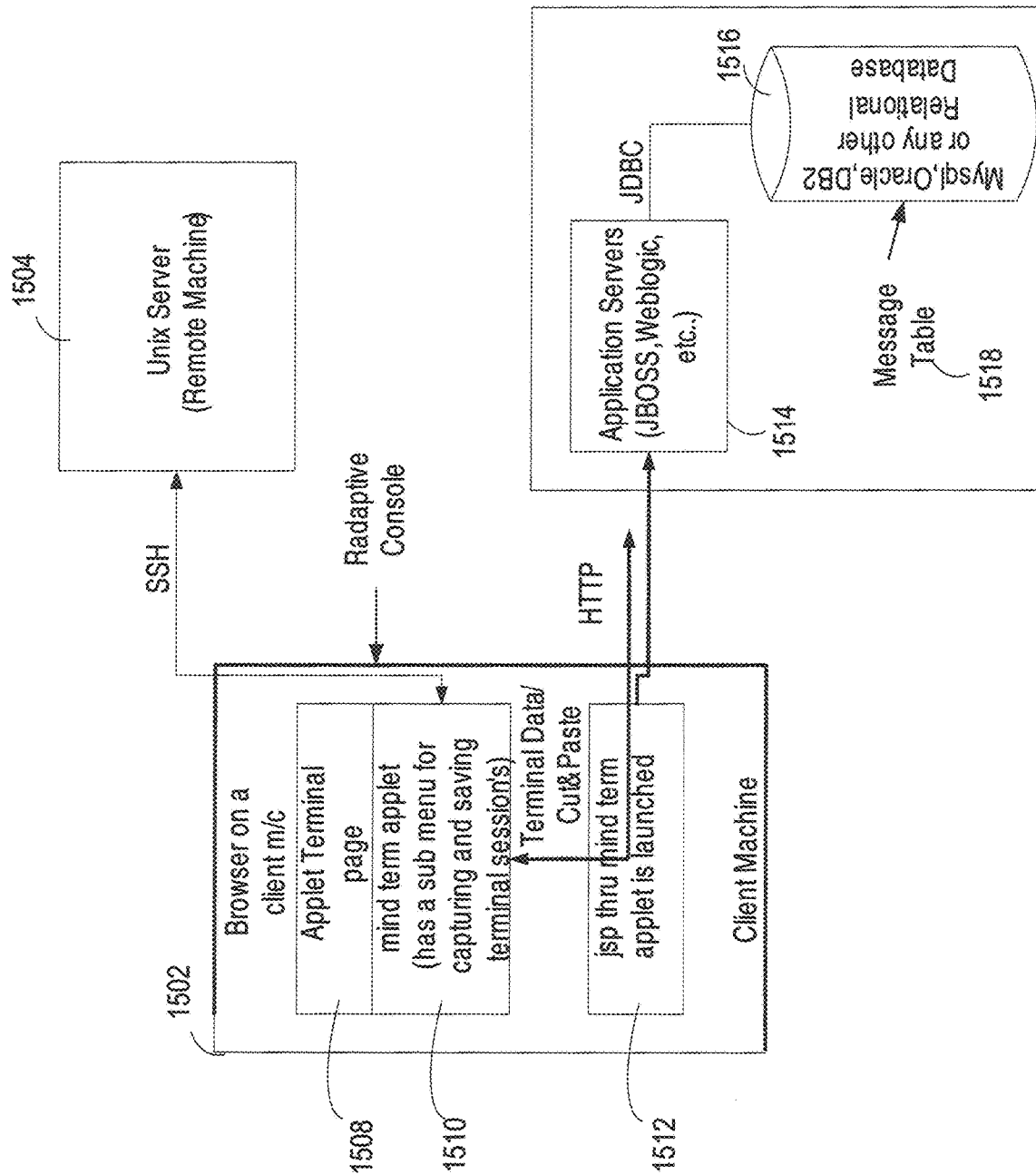
FIG. 15 is a schematic that illustrates the use of integrating tools and other terminal emulators, according to certain embodiments.

FIG. 15 is a schematic that illustrates the use of integrating tools and other terminal emulators, according to certain embodiments. FIG. 15 shows the system console 1502, a remote machine such as a Unix server 1504, application servers 1514, relational database 1516 and message table 1518. A user invokes a web browser and uses a terminal page 1508 to establish a terminal session on remote Unix server 1504 using SSH connections. The applet has a submenu 1510 for capturing and saving information (both command input an output) associated with the terminal session. Such information can be stored in relational database 1516. The MindTerm terminal applet page 1508 will be launched from a Java Server page The MindTerm session that is captured will be routed to the Application server 1514 which in turn will route it to the relational database that it is connected to for eventual storage of the data in the Message table 1516

System Administration Components

There are several system administration components in this software system, including key subsystems for application generation, business rule generation, and normalizing external data. These components are detailed in the following sections.

Application Generator

An application generation facility is provided for creating all of the files required to produce database, web application server and internet browser based client components. The application generator enables all of the technical components to be created without conventional coding, but rather through a form-driven specification of the attributes that are desired for each particular application. The application generator will provide a facility to deploy applications that can be accessed via the Internet using a Web browser.

Business Rule Generator

A software system facility enables the creation of application logic in the form of business rules. The facility provides an interface to create the control data that enables event based data validation, notification, and automation. The business rules can be created using a form which can facilitate the construction of SQL statements (SQL) to retrieve and use data from a relational database such as Oracle, Sybase, Informix, MySQL, MSSQL and DB2.

The SQL statements can be created by using higher level constructs that can automatically construct the SQL statements. The SQL statements will then be automatically invoked by the system during run time in order to enforce the business rules.

Business Rules are constructed so that they can retrieve data from another system or update data in another database table.

Personal Business Rules

Personal Business Rules are business rules that apply only to an individual user of the System. The system will allow an individual to create rules that can only be invoked for the conditions that the user has set for himself or herself. An example of a rule that can be set is as follows:

"Notify me (user) whenever a trouble ticket is opened for a customer by the name of XYZ."

If this personal business rule is to be executed, the system notifies (i.e., sends an email, for instance) whenever a Trouble Ticket (or a task) is created in the system for Customer XYZ.

Adapters

For every external workflow application, communications channel, or data source that will participate in the software system's data model, an adapter will provide the requisite access methods and attribute mapping formulas. For external workflow applications and communications channels, the external system's objects are mapped to this software system's common object model, in particular the Core-Ticket and Message objects. External data objects, such as ERP and CRM applications (Peoplesoft, Siebel, Oracle, SAP), will be mapped to a Proxy object in this software system.

Worker Interface Components

To address the user interface requirements for the system for users who are responsible for working tasks, UI components are provided by the system for real time messaging, searching for request and task data, updating object attributes, accessing related data and invoking automation functions.

Message Console

Figure 13:
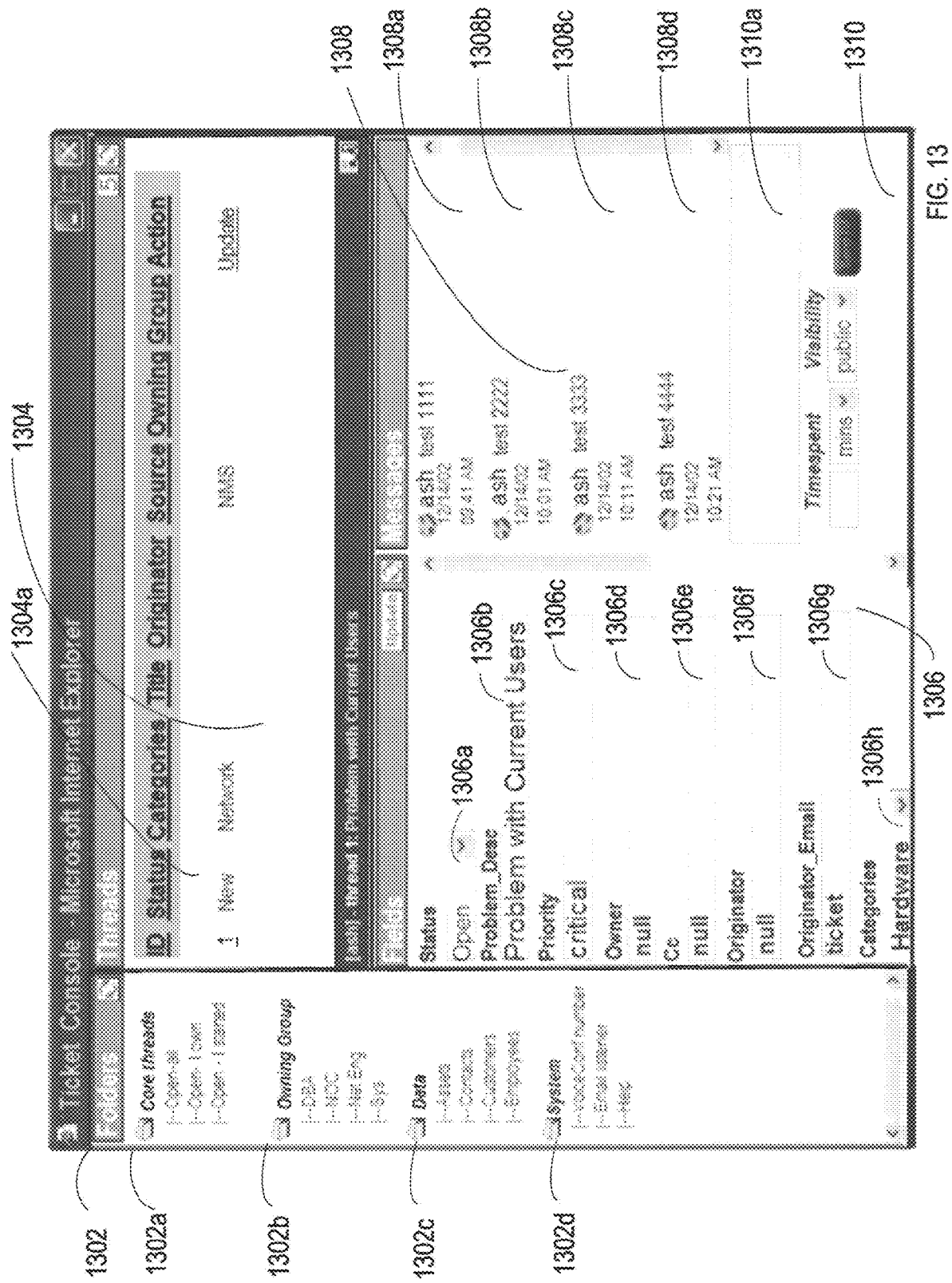
FIG. 13 shows the worker user interface that presents the normalized task and communications data, according to certain embodiments.

The Message Console UI provides a single interface to view all messages for all threads contained in the system. FIG. 13 shows the primary sub-windows of the Message Console, including:

Folders 1302—This area is used to enable the user to navigate the software system. Some of the functions that are made available for the user include searching and submitting request and task objects, system administration settings and report selection. Folders section 1302 includes core threads folder 1302a, Owning Group folder 1302b, data folder 1302c, and system folder 1302d.

Core-Ticket 1304 (Grid)—A grid shows the records (requests, tasks, projects, change requests etc. . . . ) that were returned based on the selected folder.

Messages 1308—This sub-window shows the messages 1308a through 1308d that are related to either all of the threads contained in the thread grid or only those messages for the selected individual thread. All messages are pushed from the server and received by the user interface in real-time; therefore, no manual or automatic pull/polling mechanism is required to view new messages. The messages are 'pushed' to the Web browser by using an applet that maintains a socket connection with the client (the HTML Web browser).

Add Message 1310—This sub-window provides an input area 1310a to contribute a new message for an existing thread in real-time.

Fields 1306—This sub-window shows the attributes 1306a through 1306i for the selected thread.

Project/Request/Task/Approval Detail Forms

FIG. 14 depicts an example of a detail form. The Fields 1406, Messages 1408 and Add Message 1410 sub-windows that were described with reference to FIG. 13 above are also made available on the Detail Form for an individual Project/Request/Task/Approval record. There is also a Related Details 1412 sub-window that provides the user with access to all related tools, objects and audit logs that are available in this system.

The system provides a way to use these UI components for a variety of custom forms based on the type of request or task. While the forms are customized for specific tasks, there is still a consistent set of task attributes that are collected for each type of task that enables all tasks to participate in with common system services.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for managing data on one or more projects in a business enterprise, the system comprising:
   one or more hardware processors; and
   software executable by the one or more hardware processors, wherein the software when executed:
   generates a project table configured to contain one or more projects associated with a business enterprise;
   generates a task table configured to contain one or more tasks associated with the business enterprise;
   generates one or more first associations between the one or more tasks and the one or more projects, the one or more first associations including data linking the one or more tasks and the one or more projects;
   generates a core-ticket table, the core-ticket table configured to contain the one or more first associations;
   generates a message table, the message table configured to contain one or more business communications messages in a common format;
   generates business rules, the business rules configured to identify one or more second associations between the one or more business communications messages and the one or more projects or the one or more tasks, the one or more second associations including data linking the one or more business communications messages and the one or more projects or the one or more tasks;
   establishes disparate communications channels, the disparate communication channels including a text messaging channel, an email messaging channel and a phone messaging channel;
   receives incoming business communications messages from the disparate communication channels, the incoming business communications messages being in different formats;

converts the incoming business communications messages into the common format;
stores the incoming business communications messages in the common format in the message table;
applies the business rules to the incoming business communications messages in the common format to identify the one or more second associations between the incoming business communications messages and the one or more projects or the one or more tasks and to update the one or more projects or the one or more tasks based on a topic-based parsing of the incoming business communication messages in the common format;
stores the one or more first associations in the core-ticket table, without modifying the project table or the task table;
stores the one or more second associations in the core-ticket table, without modifying the project table or the task table;
receives a subscription request to associate a user with a particular project of the one or more projects or a particular task of the one or more tasks;
uses the one or more first associations and the one or more second associations associated with the particular project or the particular task to identify an associated business communication message relevant to the user; and
forwards a notification of the associated business communication message to the user.

2. The system of claim 1, wherein the software when executed further generates at least one table of a type from a group consisting of: a request type; an approvals type; a human resources system type; an LDAP type; a user's type; a group type; an SLA agreements type; a contracts type; a maintenance agreement type; a main asset type; a purchasing system asset type; a scanning system type; an inventory system type; a files type; an images type; a fax type; an employee type; a customer type; a vendor type; and a skills type.

3. The system of claim 1, wherein the software when executed further generates core tables of different types including: a group type; a user-defined type; and a documents type.

4. The system of claim 1, wherein the software when executed further:
in response to a request to view the one or more first associations or the one or more second associations, displays the one or more first associations or the one or more second associations.

5. The system of claim 1, wherein the software when executed further:
in response to selection of the particular project, displays the one or more tasks and the one or more business communications messages associated with the particular project, as determined based on the one or more first associations and the second associations in the core-ticket table.

6. The system of claim 1, wherein the associated business communications message is received after receiving the subscription request.

7. The system of claim 1, wherein the software when executed further:
generates an employees table configured to contain attributes of employees of the business enterprise;
generates a customers table configured to contain attributes of customers of the business enterprise;
generates third associations relating the attributes of employees and the attributes of customers;
generates a core-people table configured to contain the third associations;
generates fourth associations relating the one or more first associations, the second associations, and the third associations;
generates a relationship table, the relationship table configured to contain the fourth associations; and
stores the fourth associations only in the relationship table.

8. The system of claim 1, wherein the software when executed further:
in response to receiving a particular incoming business communications message, generates a new task in the task table.

9. The system of claim 1, wherein the disparate communication channels comprise email, instant messages, voicemail, and work flow application entries.

10. A method of managing data on one or more projects in a business enterprise, the method comprising:
generating a project table configured to contain one or more projects associated with a business enterprise;
generating a task table configured to contain one or more tasks associated with the business enterprise;
generating one or more first associations between the one or more tasks and the one of more projects, the one or more first associations including data linking the one or more tasks and the one or more projects;
generating a core-ticket table, the core-ticket table configured to contain the one or more first associations;
generating a message table, the message table configured to contain one or more business communications messages in a common format;
generating business rules, the business rules configured to identify one or more second associations between the one or more business communications messages and the one or more projects or the one or more tasks, the one or more second associations including data linking the one or more business communications messages and the one or more projects or the one or more tasks;
establishing disparate communications channels, the disparate communication channels including a text messaging channel, an email messaging channel and a phone messaging channel;
receiving incoming business communications messages from the disparate communication channels, the incoming business communications messages being in different formats;
converting the incoming business communications messages into a common format;
storing the incoming business communications messages in the common format in the message table;
applying the business rules to the incoming business communications messages in the common format to identify the one or more second associations between the incoming business communications messages and the one or more projects or the one or more tasks and to update the one or more projects or the one or more tasks based on a topic-based parsing of the incoming business communication messages in the common format;
storing the one or more first associations in the core-ticket table, without modifying the project table or the task table;

storing the one or more second associations in the core-ticket table, without modifying the project table or the task table; and receiving a subscription request to associate a user with a particular project of the one or more projects or a particular task of the one or more tasks;

using the one or more first associations and the one or more second associations associated with the particular project or the particular task to identify an associated business communication message relevant to the user; and forwarding a notification of the associated business communication message to the user.

11. The method of claim 10, further comprising:

in response to a request to view the one or more first associations or the one or more second associations, displaying the one or more first associations or the one or more second associations.

12. The method of claim 10, further comprising:

in response to selection of the particular project, displaying the one or more tasks and the one or more business communications messages associated with the particular project, as determined based on the first associations and the second associations in the core-ticket table.

13. The method of claim 10, wherein the associated business communications message is received after receiving the subscription request.

14. The method of claim 10, further comprising:

generating an employee table configured to contain attributes of employees of the business enterprise;

generating a customers table configured to contain attributes of customers of the business enterprise;

generating third associations, the third associations relating the attributes of employees and the attributes of customers;

generating a core-people table configured to contain the third associations;

storing the third associations in the core-people table;

generating fourth associations, the fourth associations relating the one or more first associations, the second associations, and the third associations;

generating a relationship table, the relationship table configured to contain the fourth associations;

storing the fourth associations in the relationship table; and in response to a system-user requesting the relationship between the contents of the core-ticket table and the contents of the core-people table, displaying the contents of the relationship table.

15. The method of claim 10, further comprising:

in response to receiving a particular incoming business communications message, generating a new task in the task table.

16. The method of claim 10, further comprising:

generating at least one table of a type from a group consisting of: a request type; a project type; a task type; an approvals type; a human resources system type; an LDAP type; a user's type; a group type; an SLA agreements type; a contracts type; a maintenance agreement type; a main asset type; a purchasing system asset type; a scanning system type; an inventory system type; a files type; an images type; a fax type; an employee type; a customer type; a vendor type; and a skills type.

17. The method of claim 10, further comprising generating a core-group table, a core-other table, and a core-documents table.

18. The method of claim 10, wherein the disparate communications channels comprise email, instant messages, voicemail, and work flow application entries.

* * * * *